United States Patent
Moster et al.

[11] Patent Number: 5,938,554
[45] Date of Patent: Aug. 17, 1999

[54] ROLLER CHAIN LINK PLATE PROFILE

[75] Inventors: Alan Moster, Dryden; Timothy J. Ledvina, Groton, both of N.Y.

[73] Assignee: Borg-Warner Automotive, Inc., Sterling Heights, Mich.

[21] Appl. No.: 08/917,562

[22] Filed: Aug. 26, 1997

Related U.S. Application Data

[60] Provisional application No. 60/015,540, Sep. 30, 1996.

[51] Int. Cl.⁶ ............................................ F16G 13/02
[52] U.S. Cl. .................. 474/209; 474/206; 474/231
[58] Field of Search ............................. 474/202, 206, 474/207, 209, 212, 227, 228, 229, 231, 233, 234

[56] References Cited

U.S. PATENT DOCUMENTS

| | | | |
|---|---|---|---|
| 599,970 | 3/1898 | Menk | 474/206 |
| 2,182,443 | 12/1939 | McAninch . | |
| 2,517,497 | 8/1950 | Lauenstein . | |
| 2,722,843 | 11/1955 | Edwards, Jr. . | |
| 2,983,158 | 5/1961 | Hodlewsky | 474/231 |
| 3,359,815 | 12/1967 | Jeffrey et al. | 474/231 |
| 4,129,045 | 12/1978 | Kishitani | 474/231 |
| 4,186,617 | 2/1980 | Avramidis et al. . | |
| 4,266,435 | 5/1981 | Bendall . | |
| 4,407,551 | 10/1983 | Baylor | 474/206 |
| 4,871,344 | 10/1989 | Morisawa | 474/206 |
| 5,192,252 | 3/1993 | Shurka et al. | 474/231 |
| 5,226,856 | 7/1993 | Iacchetta et al. . | |
| 5,267,909 | 12/1993 | Iacchetta | 474/206 |
| 5,453,058 | 9/1995 | Reese et al. | 474/206 |
| 5,533,939 | 7/1996 | Martin et al. | 474/206 |
| 5,803,851 | 9/1998 | Walenta et al. | 474/206 |
| 5,803,854 | 9/1998 | Tada et al. | 474/206 |

FOREIGN PATENT DOCUMENTS 639358  6/1928  France .

OTHER PUBLICATIONS

European Search Report for EP 97 307448.

*Primary Examiner*—John A. Jeffery
*Assistant Examiner*—Matthew A. Kaness
*Attorney, Agent, or Firm*—Sidley & Austin; Greg Dziegielewski

[57] ABSTRACT

A link plate for a roller chain has material added to the location on the link plate face where fatigue failure is most likely to occur in order to increase the fatigue strength of the link plate. This location is within a sector defined by a line extending radially from the aperture center in a direction perpendicular to the line connecting the two aperture centers and an imaginary line extending from the same aperture center toward the link plate end section at an angle of 30–45 degrees.

17 Claims, 4 Drawing Sheets

ROLLER CHAIN LINK PLATE PROFILE

This application claims the benefit of U.S. Provisional Application No. 60/015,540 filed Sep. 30, 1996.

BACKGROUND OF THE INVENTION

The present invention relates generally to power transmission chains and, more particularly, to power transmission chains of the roller chain variety, such as those used primarily in automotive engine timing applications. Specifically, the present invention relates to a roller chain having an improved link plate profile for improved strength. The invention can also be applied to other automotive and non-automotive applications where an improved-strength roller chain is desired.

In a power transmission application, a roller chain is wound around at least two sprockets, with the sprocket teeth engaging rollers or bushings between the links of the chain. Rotation of a driving sprocket causes power transmission through the chain and consequent rotation of at least one driven sprocket.

A typical roller chain consists of alternate inner links and outer links. The outer links, which are sometimes known as "pin links," consist of spaced link plates each having a pair of openings or apertures. Pins are tightly received in the apertures of the outer links. The inner links, which are sometimes known as "bushing links," consist of spaced link plates each having a pair of openings or apertures. Bushings are tightly received in the apertures. The bushings freely rotate about the pins, so that the inner links are pivotally connected to the outer links or able to articulate with respect to the outer links.

In some roller chain designs, cylindrical rollers surround the bushings, and when the roller chain is wrapped around a sprocket, the teeth of the sprocket received between the laterally spaced link plates and contact the longitudinally spaced rollers. These types of roller chains are sometimes called "true roller" chains. In other roller chain designs, referred to as "rollerless" chains, rollers are not deployed on the bushings, and, instead, the sprocket teeth are received between and contact the bushings themselves. Examples of roller chain are found in U.S. Pat. Nos. 4,186,617 and 5,226,856, which are both incorporated herein by reference.

During operation, the turning of the sprockets applies tension to the chain, resulting in large stresses applied to the links of the chain. In addition, the tension in the roller chain may vary as a result of considerable load variations. For example, the roller chain may be employed in an application wherein the chain undergoes sudden stoppages in chain travel, or sudden reversals in the direction of chain travel. Alternatively, the tension in the chain may vary as a result of wide variations in temperature and thermal expansion coefficients among the various parts of the engine. For these reasons, fatigue strength and ultimate strength are prime considerations in roller chain design.

One feature of roller chains that significantly impacts the strength of the chains is the manner of securing the pins and bushings into the link apertures. The most common method used involves providing for an interference fit between the pins and bushings and the corresponding link apertures. In addition to securely positioning the pin or bushing into an aperture, interference fitting or press fitting introduces dislocations into the internal structure of the metal in the vicinity of the aperture. These dislocations increase the strength and hardness of the metal in a process similar to strain hardening. The benefits associated with the processes of interference fitting depend to a certain degree on the pins and bushings sufficient strength to resist major deformation as a result of the interference fitting. An example of the use of interference fitting to increase link fatigue strength is disclosed by Jeffrey, et al., U.S. Pat. No. 3,359,815 which is incorporated herein by reference.

Aside from press fitting of the pins and bushings, another factor in roller chain design is the importance of minimizing the mass of the chain links. The impact load on the roller chain resulting from the impact of the chain links against the sprocket teeth is closely correlated to the mass of the chain. Consequently, a major problem in the design of roller chains is the task of increasing the chain strength while minimizing increases in the mass of the chain.

Various methods have been employed to increase the strength of roller chain links. For instance, the device disclosed in Lauenstein, U.S. Pat. No. 2,517,497, is directed to reinforcing the areas around the pin apertures of the link plates. In Lauenstein, the edges of the pin holes are cold coined to increase the fatigue strength of the metal along the edge of the pin aperture. However, cold coining is a costly and time consuming process and, moreover, the increase in the strength resulting from cold coining is limited.

The device disclosed in Edwards, U.S. Pat. No. 2,722,843, is also directed at increasing the strength of the link plate by reinforcing the link plate in the immediate vicinity of the pin apertures. In Edwards, the edges of the pin apertures are pressed and stamped to form tubular extensions of the link plate extending inwardly in the lateral direction. This increases the bearing area of the link plate against the pin, which prevents excessive unit bearing loads on the edges of the pin apertures. The disadvantages of this method include the difficulty and costliness of the stamping process, given the requirement that the tubular extensions must be of precise length to allow the link plates to form a tight fitting chain.

Because of the need to minimize mass of the link plate, other conventional designs have focused on adding material to the portions of the link plate where the greatest stress is applied. For instance, the device disclosed in Jeffrey, U.S. Pat. No. 3,359,815, utilizes link plates that are thicker in the vicinity of the apertures. Buttresses, which are radially symmetric about each aperture, are added surrounding the aperture. The buttresses extend in the lateral direction. Chain links of this design may be difficult to manufacture and may result in a chain that is unacceptably thick to the engine designer.

A better roller chain design is one that has increased strength in the particular areas where failure is most likely to occur without a significant increase in the thickness of the links or a major increase in link mass. Although it has been previously known that failure originates at the edge of the aperture, experimental experience and analysis indicate that, for conventional chains having pins or bushings press fit into their apertures, the maximum working stress which causes fatigue failure occurs on the aperture within an arcuate section defined by a line extending radially from the center of the aperture in a direction perpendicular to the line connecting the two aperture centers, i.e the pitch line of the link plate, and another imaginary line originating from the same center of the aperture and extending radially toward the outer surface of the end section, this second line being displaced approximately 30–45 degrees from the first perpendicular line. Accordingly, the present invention is directed to a roller chain having link plates with added material in that region. The additional material at the point where fatigue failure is likely to occur gives the link plate more resistance to fatigue failure.

However, because the material added is located on the portion of the link plate most susceptible to fatigue failure, the amount of added material is efficiently minimized, thus minimizing the mass added to the link plate. In addition, the present link plate may be produced by standard stamping or blanking, thus avoiding the problems of manufacture experienced by other link plate designs directed to increasing the strength of the link plate.

Accordingly, it is an object of the present invention to provide a roller chain with increased tensile strength, and, more particularly, increased fatigue strength. Another object of the present invention is to provide a roller chain of increased strength which can be manufactured using standard blanking methods. A further object of the present invention is to provide a roller chain having an optimized link profile with maximum material added in the areas of potential fatigue failure the amount of material added being dependent on the size sprockets the chain must wrap.

SUMMARY OF THE INVENTION

The present invention has application in a power transmission system, where an endless chain is wound between two sprockets. The present invention is directed to a roller chain having improved strength and improved durability. Material is added to the profile of the link plates at the location on the link plate where fatigue failure originates. The added material decreases the maximum stress levels effectively making the link plate stronger, which provides for a stronger chain. Although fatigue resistance is increased, the increase in the mass of the link is minimized because only the corners of the link plate are larger than a conventional link plate.

In one embodiment of the present invention, material is added to the link plate end in a manner such that the distance from the center of each aperture to the outer edge is significantly increased in an arcuate section located midway between a horizontal and vertical line emanating from the center of each link plate aperture. The amount of added material is limited only by the requirement that the link plate corners not interfere with the link plate corners of adjacent link plates as the chain articulates around a sprocket. Because the amount of material that can be added is inversely proportional to the size of the sprocket, the amount of material that may be added is lessened as sprocket size decreases.

In another embodiment of the present invention, the improved link profile is combined with apertures that are larger than the apertures of conventional links. The larger apertures allow for larger bushings, or bushings having thicker walls. Although the larger apertures tend to decrease the strength of the link plate, this decrease is more than offset by the increase in strength resulting from the modified corners and larger bushing which imparts interference fit related benefits that are superior to those imparted by conventional bushings.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale.

DETAILED DESCRIPTION OF THE REFERRED EMBODIMENTS

The present invention is directed to providing an improved strength roller chain. Each link plate of the chain has added material on a portion of the link plate in order to reduce the maximum stress levels and the likelihood of fatigue failure. As a result, the chain of the present invention has greater resistance to fatigue failure.

Figure 1:
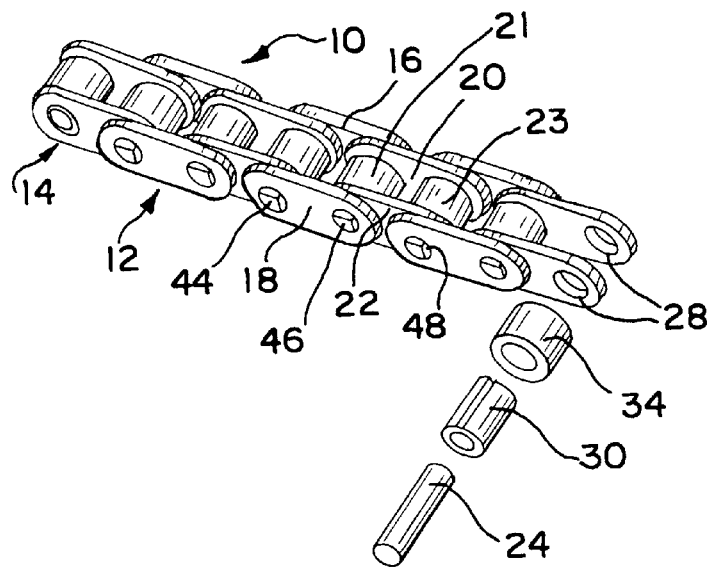
FIG. 1 is an exploded, perspective view of the roller chain of one embodiment of the present invention.

Turning now to the drawings, FIG. 1 illustrates the general construction of the roller chain of the present invention. The chain 10 is constructed of a series of links, pins, bushings, and rollers. The chain 10 includes a series of interleaved outer links 12 and inner links 14. The outer links 14 are formed by affixing a pair of outer link plates, 16, 18 onto a pair of pins 44 and 46. The distance between the centers of the two pins 44 and 46 is the chain pitch.

The spaced apart pins are fitted through apertures 48 in the outer link plates. The pins are typically secured in the outer link plates by a press fit, or welding, or any other means known in the art.

The inner links are likewise formed by a pair of link plates 20, 22 which are fixed to a pair of bushings 21, 23. The bushings are generally cylindrical in shape and spaced apart and fitted through apertures 28 in the inner link plates. The bushings are typically secured in the inner link plates by a press fit, or by welding, or any other means known in the art.

Figure 2:
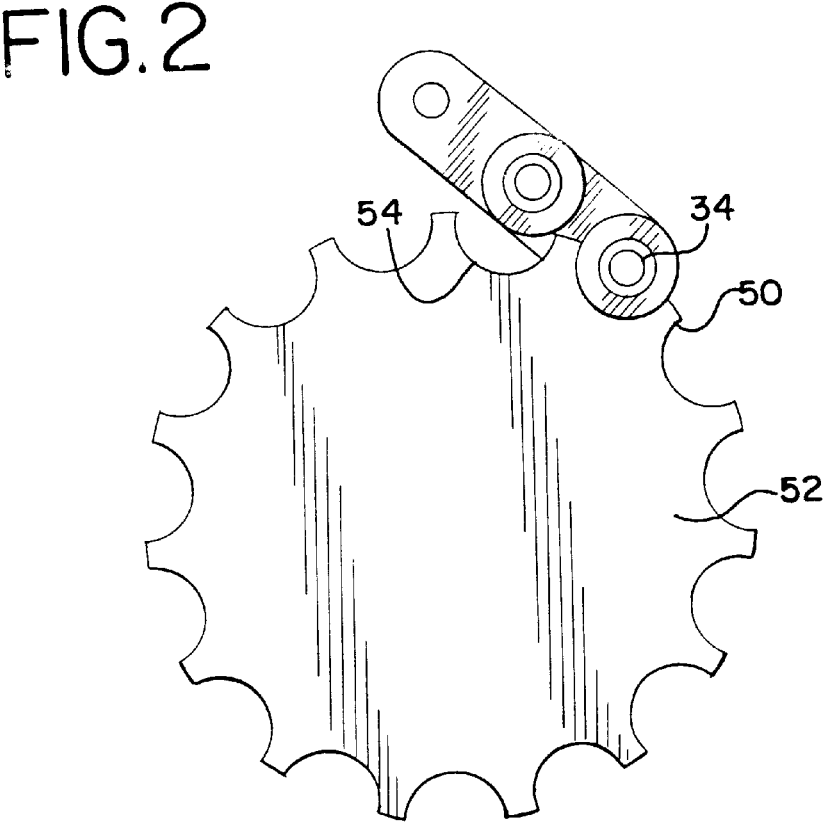
FIG. 2 is a side view of a portion of the roller chain shown in FIG. 1 engaging a sprocket.

The bushings 30 are mounted about the pins 24 and are freely rotatable about the pins. Thus, rotation of the bushings about the pins allows pivoting of the outer links with respect to the inner links. In the roller chain shown in FIG. 1, rollers 34 are mounted about the bushings 30 and are freely rotatable about the bushings. The rollers are generally cylindrical in shape and contact the sprocket teeth as shown in FIGS. 1 and 2. In other roller chains, rollers are not deployed; instead, the bushings directly contact the sprocket teeth.

Thus, the roller chain of FIG. 1 is constructed by inserting the pin 24 within the bushing 30 and inserting the bushing within the roller 34. The bushings and rollers are generally formed with a split, as shown in FIG. 1. The bushings are then secured to a pair of inner link plates and the pins are then secured to a pair of outer link plates. The inner links and the outer links alternate in series to form an endless chain. The length of the chain and the exact number of links is determined by, among other things, the application and the center distance between the sprockets.

The rollers 34 of the chain 10 contact the teeth 50 of the sprocket 52, as shown in FIG. 2. The rollers seat in the root 54 between the sprocket teeth. The outer links and inner links are constructed such that the teeth of the sprocket can be received between the link plates, in the lateral direction, and between the rollers, in the longitudinal direction.

Figure 3:
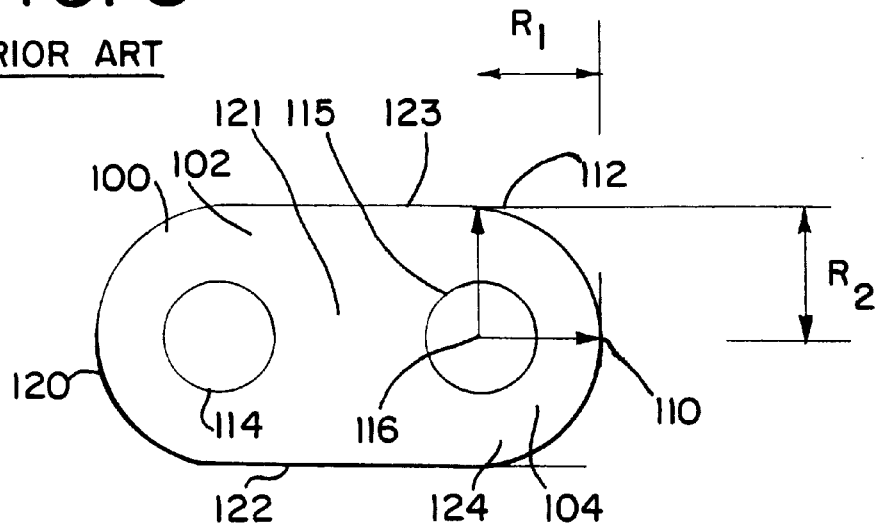
FIG. 3 is a side view of a prior art roller chain link, showing the end sections with a uniform single radius.

FIG. 3 shows a typical conventional prior art chain link. The link plate 100 has a center section 121 bounded by top and bottom edge surfaces 123 and 122. The link plate includes a pair of end sections 102, 104. Each aperture 114, 115 has a center 116. The distance between the centers 116 of apertures 114 and 115 is the chain pitch. The outer edge 120 of each link plate end section is defined by its radius, or the distance from the center of an aperture. In the conventional link plate shown in FIG. 3, the nose has a radius of R1, while the top edge 112 of the end section 104 is located at a distance R2 from the center 116 of the aperture 115. Furthermore, R1 is equal to R2, and the radius is constant throughout the end section 104. This design is known as a single end radius link plate. The circular outer edge 120 of end section 102 is blended to the outer edge 122 of center section 121. The outer edge 122 of center section 121 is shown in FIG. 3 as a straight edge, but it may also be curved.

The present invention is directed to a roller chain wherein the link plates have extra material at the portion of the end sections of the link plate most susceptible to fatigue. While many factors are involved in link failure, experience and analysis generally indicate that the portion of the link plate most susceptible to fatigue failure is the portion of the link plate contained within an arcuate section defined by a first line extending radially from the center of the aperture in a direction perpendicular to the line connecting the two aperture centers, i.e the pitch line of the link plate, and a second line originating from the center of the same aperture and extending radially toward the outer surface of the end section, this second line being displaced by approximately 30–45 degrees from the first line. Different link plate characteristics, such as the height of the link plate, the dimension from the center of the aperture to the outer edge of the end section along the link pitch line and the diameters of the aperture, can also affect the location of the point of likely fatigue failure. For example, for some link plates, the most likely point of failure may be within a 15 degree sector as defined previously, whereas for other link designs, the point of failure may occur within a sector occupying the area of the link end section bounded by two radial lines extending outwardly from the aperture center, one positioned approximately 15 degrees from a vertical line, and the other positioned 30 degrees from the same vertical line with all aforementioned angles being measured in a clockwise direction.

Figure 4:
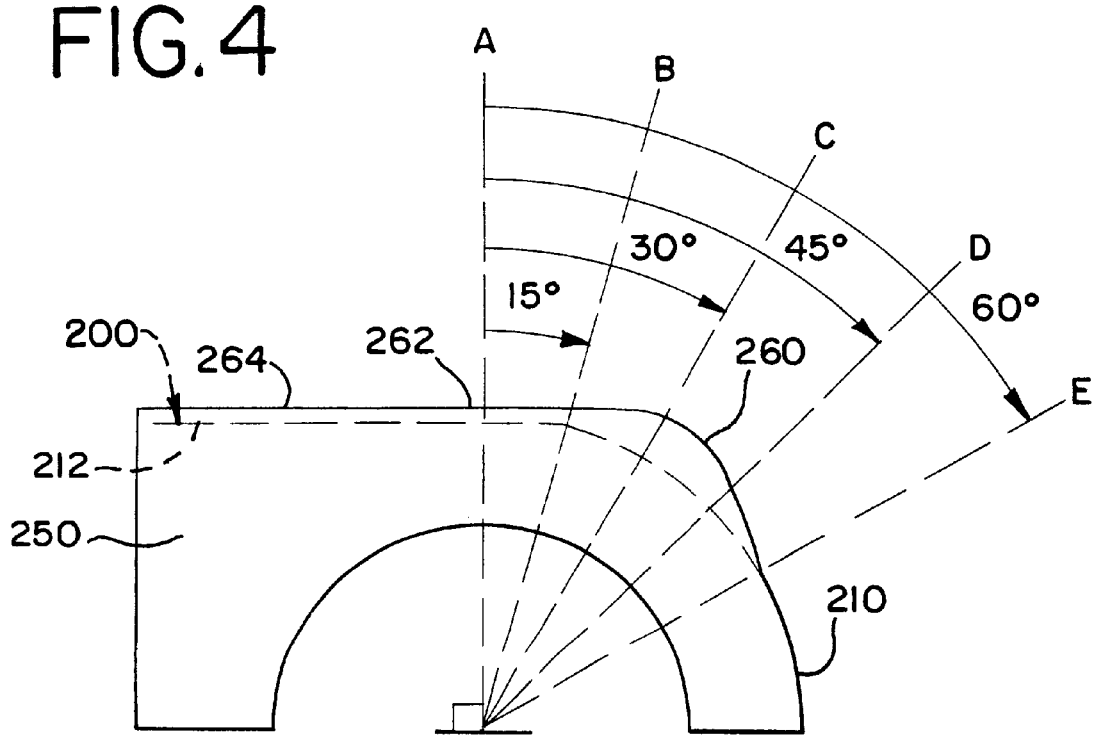
FIG. 4 is a side view of a portion of a link plate of one embodiment of the present invention compared with a portion of a link plate of the prior art.

FIG. 4 shows a link plate 250 of one embodiment of the present invention overlapped with a conventional single end radius link plate 200. The smaller outer edge 212 is the outer edge of the single end radius link plate 200 which is representative of a prior art link. Outer edge 260 is the outer edge of one embodiment of the present invention. In the embodiment of FIG. 4, the upper edge 264 of the link plate of the present invention is also higher than the upper edge 212 of the single end radius link plate, although other embodiments may have an upper edge that is not higher than the upper edge of a conventional link plate.

In the embodiment shown in FIG. 4, material has been added to the link plate 250, in comparison to the single end radius link plate 200. This material has been added at the portion of the link plate between the top of the link plate center section 262, shown as line A, and a portion of the link plate approximately 60 degrees from line A, shown as line E.

As shown in FIG. 4, the amount of material added in the region between lines A and E may vary, as will be discussed below. It has been determined by means of analytical investigations utilizing the finite element method of stress analysis that the maximum stress occurring at the aperture surface and within the sector bounded by lines A and D decreases by a significant amount when material is added as shown in FIG. 4 while keeping all other link parameters the same.

In the embodiment shown in FIG. 4, the outer boundary 260 of the present invention deviates from the single end radius outer boundary 210 by the greatest amount in the portion of the link plate between 15 and 45 degrees from vertical, shown in FIG. 4 as the portion of the link plate between lines B and D. In this region, the distance from the center of the aperture and the outer boundary 260 exceeds the single radius 210 by up to 20%. Analysis has shown specific models to be effective employing increases of 12% and 16%. In another embodiment of the present invention, the maximum distance from the center of an aperture to a point on the outer boundary of the link plate is greater than one half the height of the link, in other words, greater than one half the largest dimension of the link plate measured in a direction perpendicular to a line connecting the centers of the two apertures.

Of course, the particular portion where the material is added and the exact amount of material added may vary according to various design choices. Any design choice in which material is added to reduce the likelihood of failure in the areas of greatest stress, such as the region between lines A and E, may be employed within the scope of the present invention.

Figure 5:
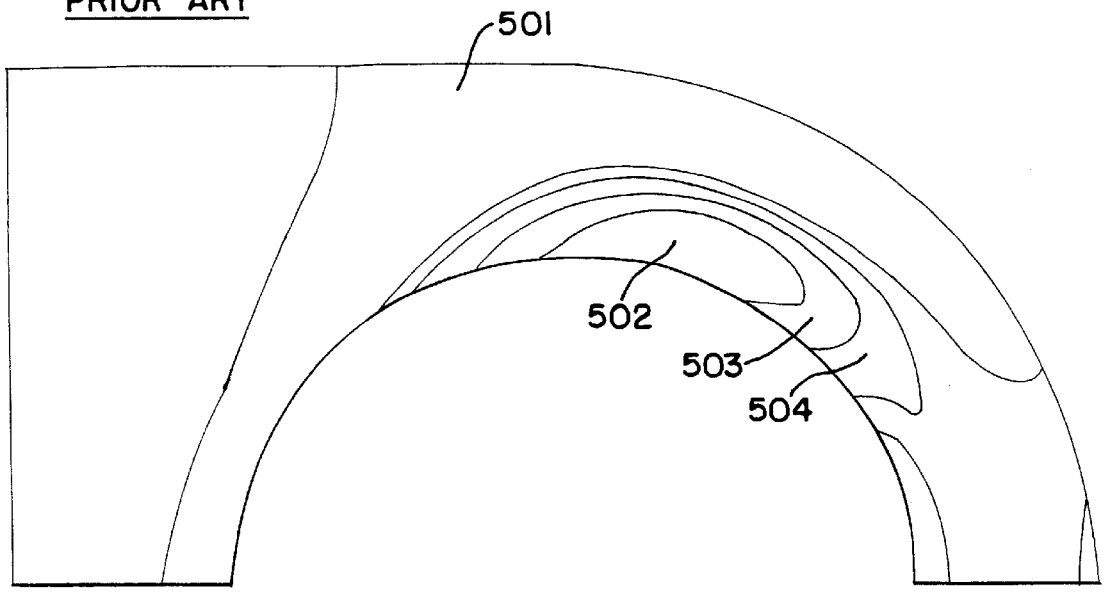
FIG. 5 is the stress distribution for a portion of a prior art link as determined by means of the finite elements method of stress analysis.
Figure 6:
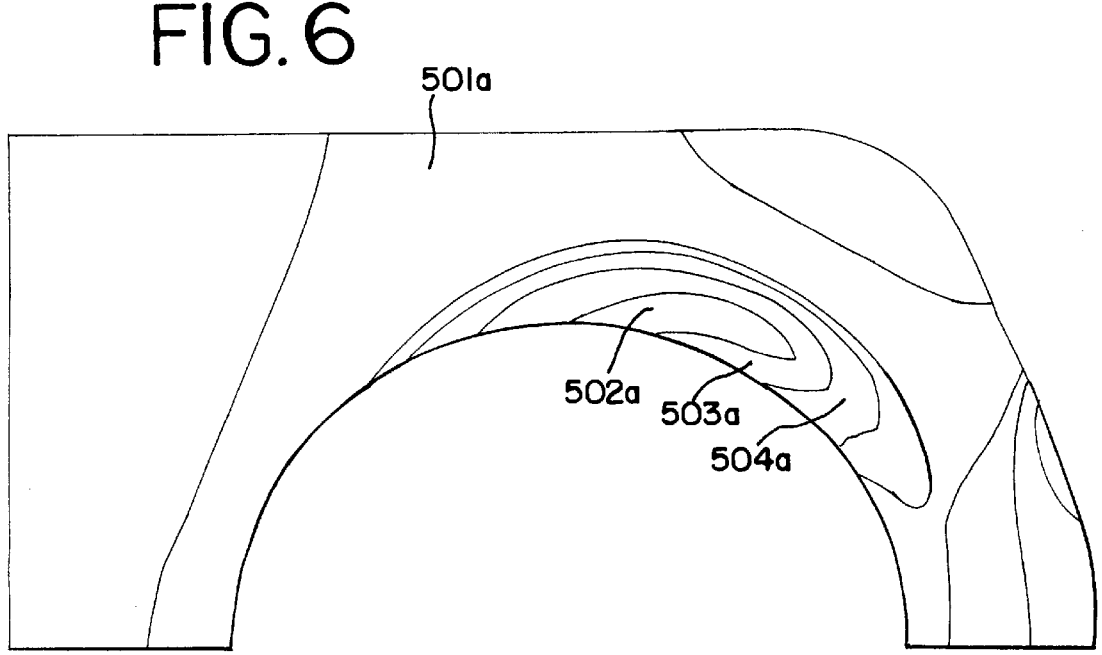
FIG. 6 is the stress distribution for a portion of a link of the present invention as determined by means of the finite elements method of stress analysis.

FIG. 5 shows the stress distributions for a prior art link plate and FIG. 6 shows the stress distributions for a link plate of one embodiment of the present invention, derived by using the finite element method of stress analysis. In FIGS. 5 and 6, the darker areas represent areas of high stress, and the lighter areas represent areas of lower stress. The dark and light areas of the finite. element method of stress analysis have been numbered in FIGS. 5 and 6 with corresponding numbers to provide a comparison of the stress distribution on a link of the prior art (FIG. 5) and the stress distribution on a link of the present invention (FIG. 6). Areas 501 and 501a indicate the boundary of the highest stress area near the aperture. Areas 502 and 502a indicate a similarly high stress area. Areas 503 and 503a indicate a slightly lower stress area that bounds areas 502 and 502a, respectively. Areas 504 and 504a indicate an even lower stress area that bounds areas 503 and 503a, respectively. The reduced sizes of areas 502a, 503a and 504a in comparison to areas 502, 503 and 504, respectively, provides an indication of the effect of the present invention. Additionally, the relative sizes of areas 501 and 501a also indicate the reduced stress concentration near the aperture for the link of the present invention. The only dimensional difference between the link shown in FIG. 5 and the link shown in FIG. 6 is the added material in the end section as discussed above. The maximum stress for the link shown in FIG. 6 is less than the maximum stress for the link shown in FIG. 5. As can be clearly seen from the proportion of light areas to dark areas, the area of maximum stress denoted by the dark area adjacent the pitch hole of FIG. 6 is dramatically reduced as compared to FIG. 5.

Figure 7:
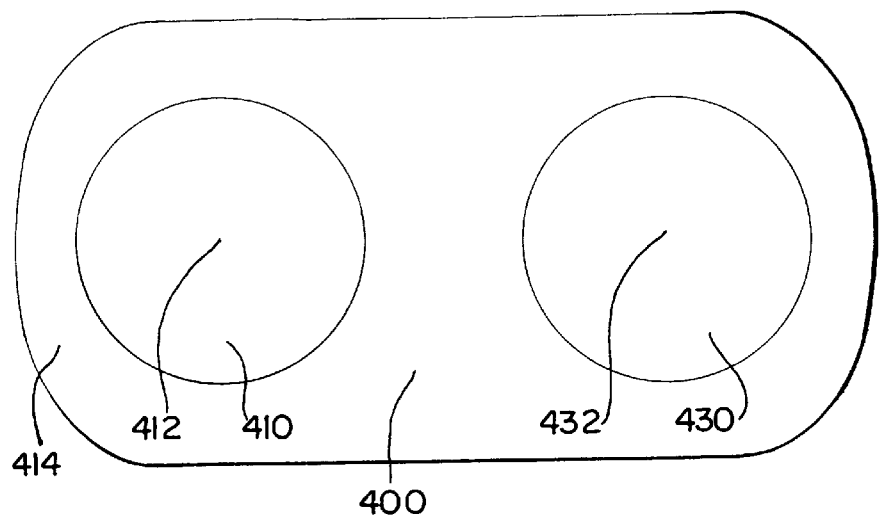
FIG. 7 is a side view of a link plate of one embodiment of the present invention.

FIG. 7 shows an entire link plate 400 of the present invention, with each corner symmetric with the others. Although it is not necessary for each corner to be symmetric, an embodiment having symmetric corners allows the roller chain to function in a multiple shaft chain and sprocket system, and to provide equal performance in either the forward or reverse longitudinal direction. The link plate 400 has two apertures 410, 430, each having a center 412, 432. The distance between the aperture centers is the chain pitch.

Figure 8:
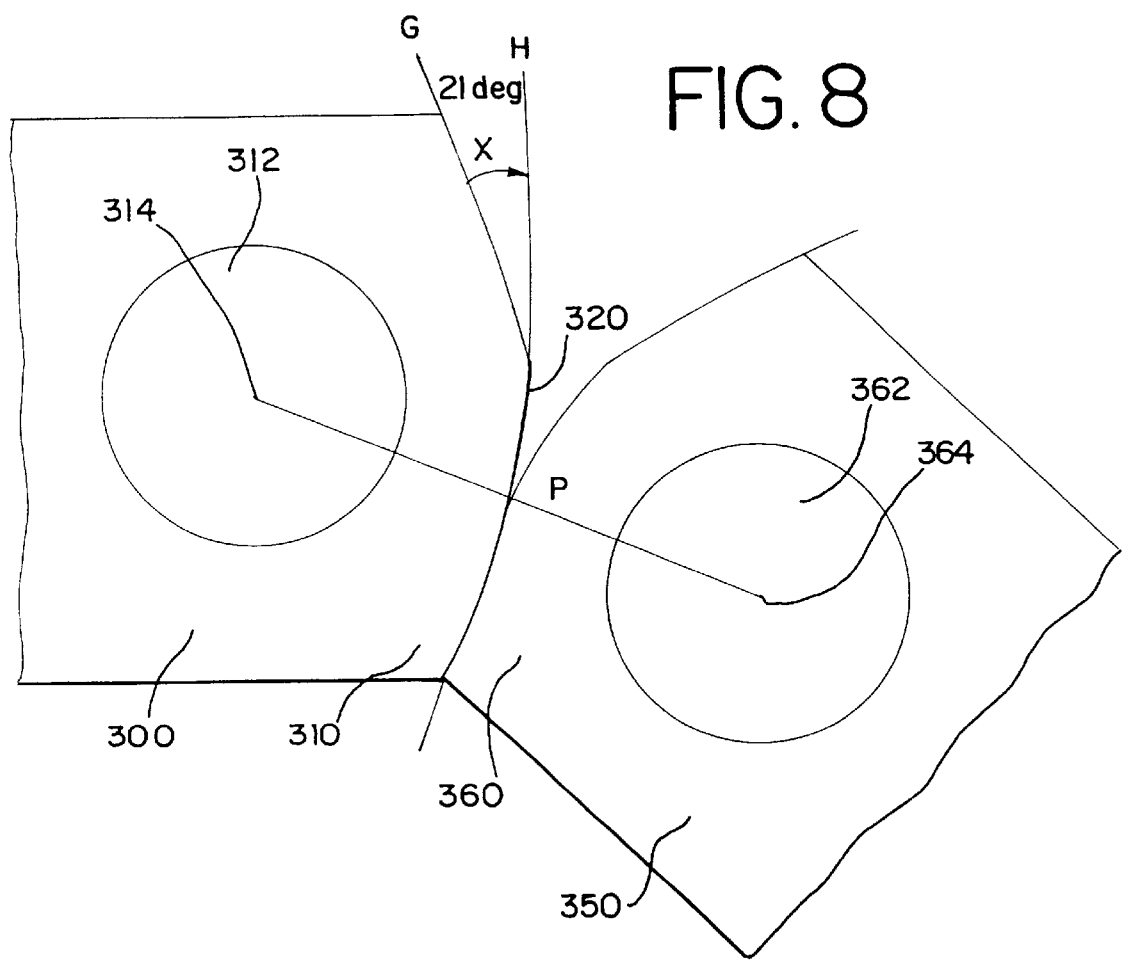
FIG. 8 is a partial side view of two link plates of the embodiment of the present invention shown in FIG. 7, which are articulated and engaging a sprocket.

FIG. 8 shows two links of one embodiment of the present invention. One limitation on the amount of material that can be added to the link plate is the requirement that the link plate corners must not interfere with the corners of the adjacent link plate when the chain articulates around a sprocket.

Referring to FIG. 8, the lower corner 310 of a first link plate 300 is adjacent to the lower corner 360 of a second link plate 350. The first link plate 300 has an aperture 312, having an aperture center 314. The second link plate 350 has an aperture 362 having an aperture center 364. Due to the interleaving of the link plates, a pin (not shown) passing through aperture 312 and a pin passing through aperture 362 must necessarily pass through the two cylindrical bushings which are affixed to the apertures of a third link plate (not shown). For instance, if the first link plate 300 and the second link plate 350 are outer link plates, then an inner link plate must have a first bushing aperture aligned with the aperture 312 of the first link plate and a second bushing aperture aligned with the aperture 362 of the second link plate. Hence, the distance between the center 314 of aperture 312 of the first link plate 300 and the center 364 of the aperture 362 of the second link plate 350 must be the pitch of the link plates.

Because the distance between the first link plate aperture 312 and the second link plate aperture 362 is the pitch, and because the corner of the first link plate 310 must not interfere with the corner of the second link plate, the maximum dimensions of end sections of the links are limited. The corners cannot extend beyond the line shown in FIG. 8 as line G. The location of line G is determined by establishing angle X which is the angle between line G and line H, which is a vertical line extending from a point along the extended pitch line of the link located one half the pitch distance from center 314 of aperture 312 in the vicinity of the outermost point 320 of link 300. Angle X is determined by dividing 360 degrees by the smallest number of teeth that a sprocket can have that will be functional with the link of the present invention. For instance, FIG. 8 depicts a chain capable of articulating around a sprocket having 17 teeth. Hence, the corners of the link plate cannot extend beyond line a which is 360/17=21 degrees displaced in a counter-clockwise direction from line H as previously defined.

The link plate shown in FIG. 7 also illustrates another embodiment of the present invention, wherein the link plate corners have added material, but the apertures 410, 430 also have a large diameter. For a single end radius link plate, increasing the diameter of the aperture tends to decrease the strength of the link plate. In the present invention, however, the decrease in strength resulting from the larger aperture is offset by the increase in strength resulting from the material added at the corners 414. In addition, the larger aperture allows the use of a larger diameter bushing or pin, or a bushing having an increased wall thickness, which significantly increases the fatigue resistance of the link because the stronger bushing can impose a greater interference fit on the inside link aperture. For instance, a link plate having a pitch distance of 8 mm was modified according to the teaching of the present invention. Additionally the bushing diameter was increased in order to enhance the fatigue resistance of the bushing. In spite of the increased link aperture size, the fatigue resistance, as measured by cycles to failure at a certain load, was increased over the fatigue resistance of the original link with the smaller aperture and the single radius end.

In the embodiment shown in FIG. 7, the height of the link plate is 7.6 mm (measured along a line perpendicular to a line connecting the two aperture centers), and the outer bushing (not shown) diameter is approximately 5.3 mm; the bushing diameter is approximately 70% of the height of the link plate. In contrast, a typical prior art design employs bushings having diameter of 4.76 mm for a 7.6 mm link plate; the prior art bushing diameter is approximately 63% of the link height. Of course, variations in material properties and punching or stamping technology may allow other size bushings to be employed within the scope of the present invention. In particular, the diameter of the pin, the thickness of the link plate at the nose, and the thickness of the bushing wall may be varied for optimum strength and fatigue resistance.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description consequently, while the invention has been described with reference to particular embodiments, modifications of structure, sequence, materials and the like would be apparent to those skilled in the art, yet still fall within the scope of the invention.

What is claimed is:

1. A roller chain assembly, comprising:

a series of interleaved inner and outer links, each outer link comprising a pair of outer link plates fixedly mounted to spaced pin members, each outer link plate having a pair of round apertures for receiving said pin members, each round aperture being concentric around a centerpoint, each outer link plate having a horizontal centerline defined between the centerpoints of said apertures;

each inner link comprising of a pair of inner link plates fixedly mounted on a pair of bushings disposed to turn on said spaced pin members of said outer links, each inner link plate having a pair of round apertures for receiving said bushings, each round aperture being concentric around a centerpoint, each inner link plate having a horizontal centerline defined between the centerpoints of said apertures;

each of said inner links and said outer links being adapted to receive a sprocket tooth;

each of said link plates having a central section and a pair of end sections contiguous to said central section, each of said link plate apertures positioned within one of said end sections, each said end section having an outer boundary curvilinear in form and defined by a plurality of radii, said plurality of radii including a first radius and a second radius, each of said radii being the distance from said centerpoint of said end section aperture to a different point along said outer boundary; and each said end section being so selected that said first radius has a different length from said second radius, each said end section being symmetrical about said horizontal centerline of said link plate.

2. The roller chain assembly of claim 1, said curvilinear outer boundary selected such that the largest radii of said plurality of radii are positioned at the location on said outer boundary of maximum stress.

3. The roller chain assembly of claim 1, wherein:

each said end section includes a nose portion, said nose portion being defined as the point on said outer boundary which lies on said horizontal centerline connecting the centers of said link plate apertures;

a first portion of each said end section being defined by first and second lines along said links and said outer boundary, said first line extending through said centerpoint of said end section aperture to a point on said outer boundary displaced from said nose portion by 30 degrees and a second line extending from the center of said end section aperture to a point on said outer boundary displaced from said nose portion by 75 degrees; and each point of said outer boundary of said first portion having a radius greater than the radius of said nose portion, each said end section having said outer boundary tapering away at an angle from a vertical line on said outer boundary displaced from said nose portion by 90 degrees, said angle of taper being less than 21 degrees.

4. The roller chain assembly of claim 1, wherein:

each said end section includes a nose portion, said nose portion being defined as the point on said outer boundary which lies on a line connecting the centers of said link plate apertures;

a first portion of each said end section being defined by first and second lines along said links and said outer boundary, said first line extending through the center of said end section aperture to a point on said outer boundary displaced from said nose portion by 30 degrees and a second line extending from the center of said end section aperture to a point on said outer boundary displaced from said nose portion by 60 degrees; and each point of said outer boundary of said first portion having a radius greater than the radius of said nose portion.

5. The roller chain assembly of claim 1, wherein:

each said end section includes a nose portion, said nose portion being defined as the point on said outer boundary which lies on a line connecting the centers of said link plate apertures;

a first portion of each said end section being defined by first and second lines along said links and said outer boundary, said first line extending through the center of said end section aperture to a point on said outer boundary displaced from said nose portion by 45 degrees and a second line extending from the center of said end section aperture to a point on said outer boundary displaced from said nose portion by 75 degrees; and each point of said outer boundary of said first portion having a radius greater than the radius of said nose portion.

6. The roller chain assembly of claim 1, wherein:

each said end section includes a nose portion, said nose portion being defined as the point on said outer boundary which lies on a line connecting the centers of said link plate apertures;

a first portion of each said end section being defined by first and second lines along said links and said outer boundary, said first line extending through the center of said end section aperture to a point on said outer boundary displaced from said nose portion by 45 degrees and a second line extending from the center of said end section aperture to a point on said outer boundary displaced from said nose portion by 60 degrees; and each point of said outer boundary of said first portion having a radius greater than the radius of said nose portion.

7. The roller chain assembly of claim 1, wherein a first point on said outer boundary has a radius which is more than 10% greater than the radius of a second point on said outer boundary.

8. The roller chain assembly of claim 1, wherein a first point on said outer boundary has a radius which is 10–25% greater than the radius of a second point on said outer boundary.

9. The roller chain assembly of claim 1, wherein a first point on said outer boundary has a radius which is 12–18% greater than the radius of a second point on said outer boundary.

10. The roller chain assembly of claim 3, wherein a first point within said first portion of said end section has a radius which is more than 10% greater than the radius of said nose portion of said outer boundary.

11. The roller chain assembly of claim 3, wherein a first point within said first portion of said end section has a radius which is 10–25% greater than the radius of said nose portion of said outer boundary.

12. The roller chain assembly of claim 3, wherein a first point within said first portion of said end section has a radius which is 12–18% greater than the radius of said nose portion of said outer boundary.

13. The roller chain assembly of claim 1, wherein the maximum distance from said center of said end section aperture to said end section outer boundary is greater than one half the greatest height of said link plates, said height measured along a line perpendicular to a line connecting the centers of said link plate apertures.

14. The roller chain assembly of claim 1, wherein said bushings have an outer diameter which is greater than 65% of the greatest height of said link plates, said height measured along a line perpendicular to a line connecting the centers of said link plate apertures.

15. The roller chain assembly of claim 1, wherein said inner link apertures have a diameter which is greater than 68% of the greatest height of said link plates, said height measured along a line perpendicular to a line connecting the centers of said link plate apertures.

16. The roller chain assembly of claim 1, wherein the curvilinear outer surface of the end sections includes linear segments at the ends of the sections adjoining the central section which blend with the outer surfaces of the central section without any discontinuity.

17. The roller chain assembly of claim 1 wherein the bushings of the inner links are surrounded by cylindrical rollers that are freely rotatable about the bushings for engagement with the sprocket teeth.

* * * * *